Dec. 1, 1942.  K. J. HORSTMANN  2,303,641
GYROSCOPICALLY OPERATED INDICATOR FOR AIRCRAFT
Filed July 31, 1941
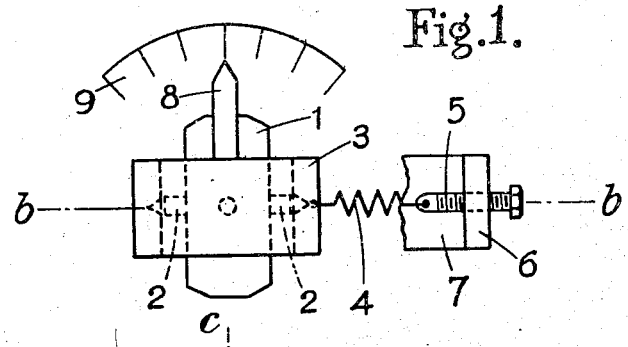
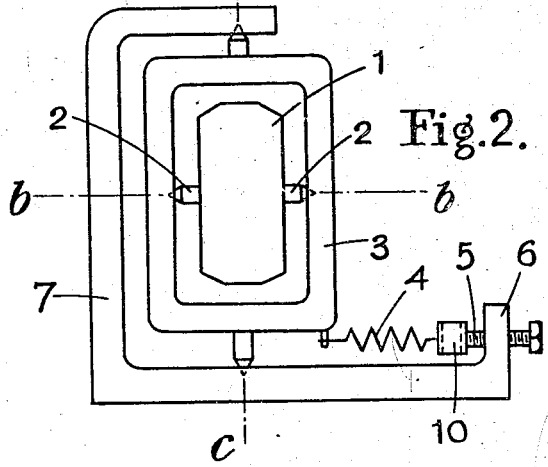
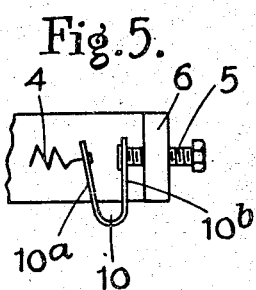
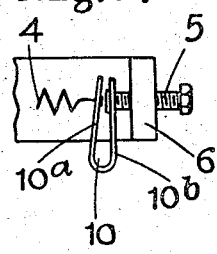
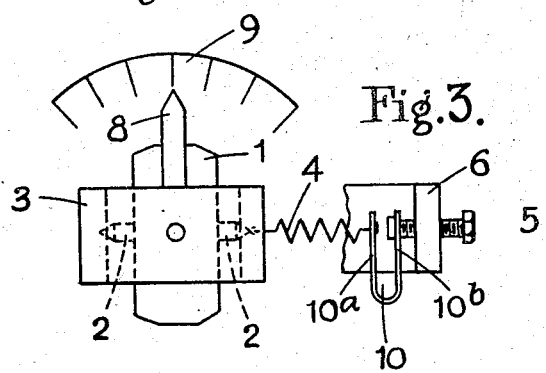
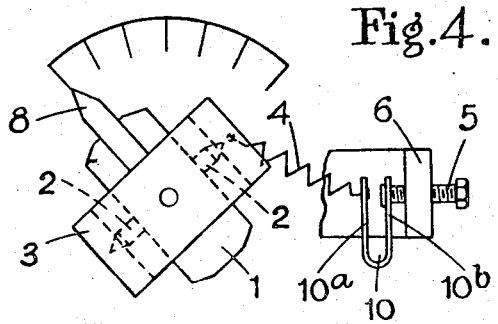
INVENTOR
KENNETH J. HORSTMANN

UNITED STATES PATENT OFFICE 2,303,641

GYROSCOPICALLY OPERATED INDICATOR FOR AIRCRAFT

Kenneth John Horstmann, Bath, England

Application July 31, 1941, Serial No. 404,952
In Great Britain February 10, 1941

3 Claims. (Cl. 33—204)

This invention relates to gyroscopically operated indicators for aircraft and other instruments of the kind employing zeroising or stabilising springs.

A disadvantage experienced with known gyroscopically operated indicators of the above kind is that changes in temperature adversely affect the apparatus with the result that inaccurate readings are indicated by the indicator. For example, it has been found when using tension springs that readings are generally high when the apparatus is tested at high temperature and low when tested at low temperature. This is not an invariable rule, but cited merely as an example of variations in the behaviour of an instrument due to temperature changes.

I have carried out tests at high and low temperatures and I have found that the cause of the apparatus indicating inaccurate readings is due to a number of circumstances of which may be mentioned (a) change in elasticity of the spring, (b) change in convolute length of spring and (c) with gyroscopic apparatus—difference in the volume of air passed through the air jet operating the gyroscopic rotor at different temperatures.

With known gyroscopically operated indicators of the kind referred to it is usual to anchor one end of a zeroising or stabilising spring to the gimbal frame within which the gyroscope is mounted and the other end of the spring to a part such as a screw which is adjustable initially to tension the spring according to room or other predetermined temperature. By experiments I have found that by increasing the tension of the spring satisfactory readings could be obtained at high temperatures and conversely by reducing the tension of the spring satisfactory readings could be obtained at low temperatures. However to obtain accurate readings at all times during which the temperature may vary considerably it would be necessary constantly to reset the spring adjustment to vary the tension of the spring. This constant resetting of the spring tensioning would, of course, be impracticable.

The above mentioned disadvantages are overcome by the present invention which provides means by which accurate readings of the indicator are obtainable automatically over a wide range of temperature variations.

According to this invention a gyroscopically operated indicator or other instrument of the kind referred to is provided wherein, for the purpose of compensating for variations in readings due to temperature changes, a thermally sensitive element is connected to the spring in such a way that it is adapted automatically to vary the tension or compression of the spring as the temperature varies.

It is possible to devise many thermally sensitive elements which would be suitable but I have found that in practice an element such as a strip of bi-metal, preferably of U outlines is particularly suitable as it is reliable and durable in operation and not costly. When employing a bi-metal strip of U outline, one of the parallel limbs of the strip is connected to the outer end of the spring and the other limb is connected to the adjustable part of the instrument which would normally support the outer end of the spring. The arrangement is such that at high temperatures the limb of the U shaped element which is connected to the spring flexes towards the other limb of said element and so increases the tension of the spring whilst at low temperatures the first mentioned limb flexes away from the other limb thereby permitting the tension of the spring to be reduced.

In order that the invention may be clearly understood and readily carried into effect reference will now be made to the accompanying drawing which illustrates diagrammatically and by way of example one embodiment of the invention and whereon:

Fig. 1 is a plan view illustrating the kind of apparatus with which the present invention is concerned but to which the invention has not been applied;

Figs. 2 and 3 comprise elevation and plan views respectively of apparatus similar to Fig. 1 but fitted with the means provided by this invention;

Fig. 4 is a view similar to Fig. 3 but showing the gyroscope and its gimbal frame in a precessed or deflected position whilst, Figs. 5 and 6 show the state of the thermally sensitive element respectively at low and high temperatures.

Referring firstly to Figure 1 of the drawing this figure shows the kind of apparatus with which the present invention is concerned. The gyroscope is indicated by the reference numeral 1 and rotates about the axis $b-b$ on bearings 2 mounted in the gimbal frame 3 which in turn oscillates about the axis $c-c$ (Fig. 2) in a frame 7. The oscillation of the gimbal frame 3 is controlled by a coiled tension spring 4 which is anchored at one end to the gimbal frame 3 and at its other end to an adjustable anchorage, such as a screw or other suitable part 5 mounted in a part 6 of the frame 7. The spring 4 serves normally to hold the gimbal frame 3 and therefore the gyroscope 1 in an undeflected position in which a pointer 8 carried by the gimbal frame 3 registers a zero reading midway on a scale 9. Although the present invention is not so limited, the gyroscopic instrument illustrated is intended to indicate the rate of turn of an aircraft during which turning of the aircraft the gyroscope is caused to precess and thereby forces the gimbal frame 3 to turn about its axis c to c against the influence of the spring 4. The pointer 8 moves with the gimbal frame 3 and indicates on the scale 9 a position corresponding to the rate in degrees per minute at which the aircraft is making a turn. In calibrating these instruments the readings are first corrected by altering the tension of the spring 4 by adjusting the screw 5 so that the pointer 8 indicates a correct reading on the scale 9 at a certain temperature, usually room temperature. As already explained however variations in temperature have an adverse effect on the instrument chiefly because of physical changes in the spring 4 and on the oil in the bearings 2 of the gyroscope, which results in a variation of the true reading being indicated. For this reason very high tolerance of error has to be allowed for at high and low temperature tests.

I have found that by moving the adjustable anchorage or screw 5 of the spring 4 to increase the tension of the spring 4 that satisfactory readings could be obtained at high temperatures and conversely by reducing the tension of the spring 4 improved readings could be obtained at low temperature tests. However to obtain correct readings over a large range of temperatures it would mean that the screw 5 would constantly have to be moved to adjust the tension of the spring 4 with every change in temperature and the continuous adjustment of the screw is not a practical proposition. For this purpose there is provided as shown in Figures 2 to 4 of the drawing a thermally sensitive element 10 which may conveniently comprise a bowed or U shaped piece of bi-metal which is located between the outer end of the spring 4 and the adjustable anchorage 5. According to the arrangement shown the limb 10a of the bi-metal member 10 moves away from the limb 10b at low temperatures as shown by Figure 5 and towards the limb 10b at high temperatures as shown by Fig. 6 thus slackening and increasing the tension of the spring 4 and so compensating for the variation of the true readings which would occur normally.

As already stated it is convenient to use a bi-metal member of the character described but the use of other thermally sensitive members is not excluded. For instance, if desired, the thermally sensitive member could comprise a mercury container or an expansible capsule having means adapted to move with the expansion and contraction of the mercury at different temperatures, the means being connected with the outer end of the spring 4 so as to act upon the spring similarly to the manner in which the limb 10a of the bi-metal member 10 acts upon the spring. Whilst the invention has been described as applied to a single spring, it will be appreciated that it could also be applied individually to a number of springs should the deflection of the gyroscope be controlled by more than one spring. In this case the thermally sensitive device could be interposed between two units of a composite spring. In another arrangement the thermally sensitive device could be secured to the spring somewhere along its length so as to bend the axis of the spring for increasing the tension.

Various instruments other than gyroscopically-operated instruments employing zeroising or stabilising springs are included in the invention, among which may be cited centrifugal-governor type speed indicators in which the indicating hand is zeroised by means of a spring. Another form of instrument to which the invention is applicable is one in which the inertia of a weight is employed instead of a gyroscope as in the case described herein, the indicator being zeroised by a spring. Further, instruments of the kind set forth employing compression springs for stabilising are comprehended within the terms of the invention.

I claim:

1. A gyroscopically operated indicator comprising a gyroscopic rotor, a gimbal frame supporting said rotor, a supporting frame in which said gimbal frame is mounted for rotary movement, and a connection between said gimbal frame and said supporting frame including a spring tending constantly to urge said gimbal frame to a predetermined position relative to said supporting frame, said connection also including a thermally sensitive member in series with said spring to vary the strength of said spring in response to changes in temperature, thereby to compensate for physical variations in the spring due to temperature changes.

2. A gyroscopically operated indicator comprising a gyroscopic rotor, a gimbal frame supporting said rotor, a supporting frame in which said gimbal frame is mounted for rotary movement, an adjusting screw carried by said supporting frame, a thermally sensitive member of U-shape including a pair of legs one of which is connected to said adjusting screw, and a coil spring connecting the other leg of said member to said gimbal frame and tending constantly to urge said gimbal frame to a predetermined position relative to said supporting frame, said thermally sensitive member acting to vary the strength of said spring in response to changes in temperature, thereby to compensate for physical variations in the spring due to temperature changes.

3. A gyroscopically operated indicator as set forth in claim 1 including manually adjustable means in the connection between the gimbal frame and the supporting frame for varying the force exerted by said connection.

KENNETH JOHN HORSTMANN.